Feb. 3, 1925.

G. B. COLEMAN

GEARING

Filed July 14, 1924

1,525,070

George B. Coleman — INVENTOR.

Patented Feb. 3, 1925.

1,525,070

UNITED STATES PATENT OFFICE.

GEORGE B. COLEMAN, OF SAN FRANCISCO, CALIFORNIA.

GEARING.

Application filed July 14, 1924. Serial No. 725,941.

*To all whom it may concern:*

Be it known that I, GEORGE B. COLEMAN, a citizen of the United States, residing at San Francisco, in the county of San Francisco and State of California, have invented new and useful Improvements in Gearing, of which the following is a specification.

This invention relates to gearing and particularly to differential gearing adapted for use in connection with motor vehicles or with machines of other character requiring differential gearing.

An object of the invention is to provide gearing of the differential type which will freely and easily adjust itself to load conditions upon the independently rotatable driven gears or axles, which comprise a minimum number of parts, is simple to construct and relatively inexpensive and which is extremely flexible and smooth in operation.

One form of my invention is illustrated in the accompanying drawing in which—

Figure 1:
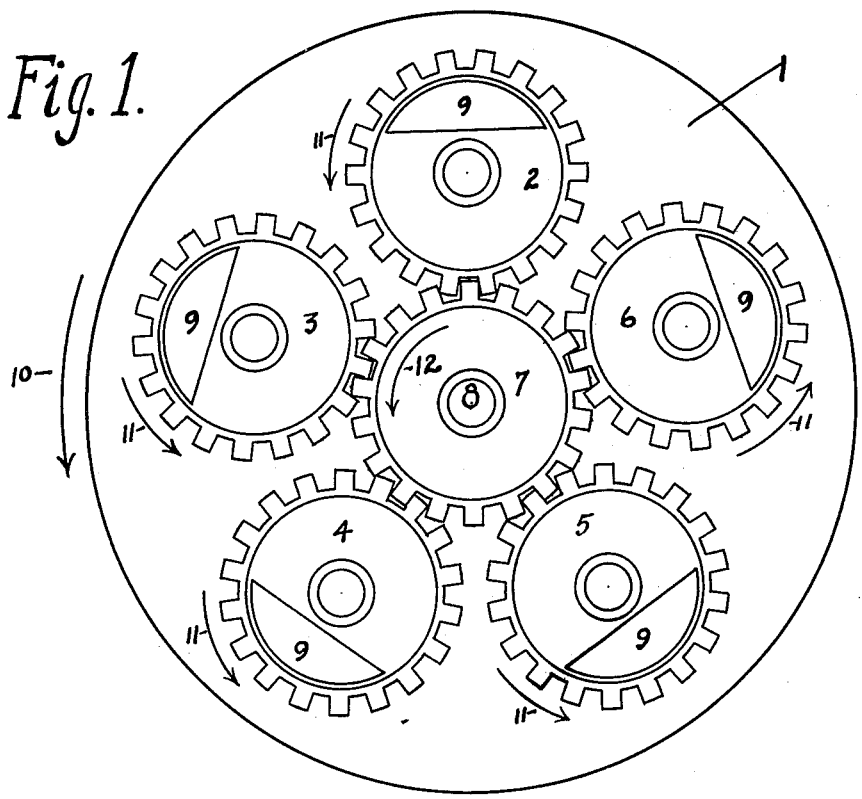
Figure 1 is a section on line 1—1 of Figure 5, showing in side elevation the main wheel of the differential, one of the driven gears, and a plurality of idler gears or pinions.
Figure 2:
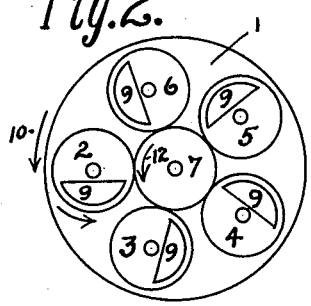
Figures 2, 3 and 4 are similar to Figure 1 but on a smaller scale and showing the idler gears in positions different from that which they occupy in Figure 1.

The propeller shaft or power shaft of the automobile or other machine with which the gearing is used is indicated at 16 and the end of this shaft is provided with a bevelled gear, the teeth of which mesh with the teeth of the relatively large bevelled wheel, 1, disposed with its axis transverse to the axes of shaft 16. Driven gears are indicated at 7 and 14 respectively, these gears being co-axial with wheel 1 and provided with driven shafts 8 and 15 respectively, likewise co-axial with wheel 1.

Supported upon stub shafts spaced equidistantly from each other and equidistantly from the axes of wheel 1 are a series of idler gears or pinions 2, 3, 4, 5 and 6 respectively, these gears being of equal diameter and meshing with the corresponding driven gear. There are, of course, two series of these pinions, one series on each side of wheel 1. Each pinion of each gear is provided with an eccentric weight member 9 secured thereto in any suitable manner.

Figure 3:
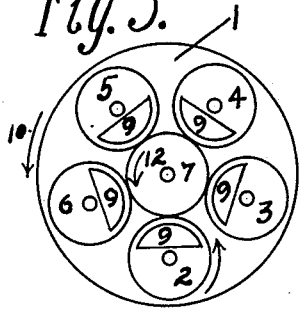
Figure 4:
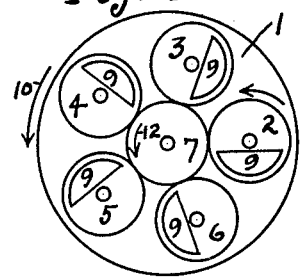
Figure 5:
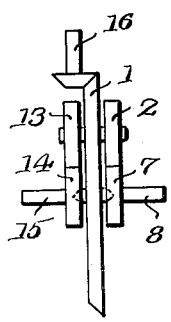
Figure 5 is an end view of the differential gearing.

If the wheel 1 be rotated by means of shaft 16 in the direction of arrow 10, Figure 1, the pinions 2, 3, 4, 5 and 6 will revolve with wheel 1 but will remain constantly in mesh with the driven gears 7 and 14 respectively. After wheel 1 has reached a certain speed, centrifugal force being exerted upon the eccentric weights 9, these weights will tend to hold the gears 2, 3, 4, 5 and 6 in the position shown in Figure 1. This retarding action will occur during those portions of the cycle of revolution of the pinions in which the weights 9 are moving inwardly, and will cause the driven gears 7 and 14 to revolve in the direction of arrow 12. In Figure 3, the weights are shown to be in position to start their outward movements and in Figure 4 they are shown to have completed one half of their outward movements. During such outward movement the pinions will be free to revolve in the direction of arrow 11 and little or no motion will be imparted to gear 7. When wheel 1 has reached the speed corresponding to the load requirements centrifugal force will hold the gears 2, 3, 4, 5 and 6 in fixed position as shown in Figure 1 and the wheel 1, and the gears 7 and 14 will revolve at the same speed, it being understood that a second set of gears, of which only one gear numbered 13 is shown, is positioned on the opposite side of wheel 1 from gears 2, 3, 4, 5 and 6 and that the gears of this second set are similar in dimension to the gears of the first set, and similarly positioned relatively to each other and to wheel 1. If equal loads be applied to driving shafts 8 and 15 they will both be rotated at the same speed. If more load be applied to one than to the other they will be rotated at different speeds and each will independently adjust itself to load conditions in the well-known manner of differential gearing.

Having thus described my invention, what is claimed as new and desired to be secured by U. S. Letters Patent is:

1. A differential gear comprising a central rotatable wheel, means to rotate the wheel, a driven gear on each side of the wheel and co-axial therewith, said driven gears being independently rotatable, a set of pinions mounted on each side of the wheel, the pinions of each set being bodily rotatable about the axis of the wheel, rotatable about their own axes, and in constant mesh with the corresponding driven gear, said pinions being also eccentrically weighted so that a driving force is exerted on the driven gear meshing therewith as set forth.

2. A differential gear comprising a central rotatable wheel, means to rotate the wheel, a driven gear on each side of the wheel and co-axial therewith, said driven gears being independently rotatable, a pinion mounted on each side of the wheel, each pinion being bodily rotatable with the wheel about the axis of the wheel, rotatable about its own axis, and in constant mesh with the corresponding driven gear, said pinions being also eccentrically weighted so that a driving force is exerted on the driven gear meshing therewith, as set forth.

3. A differential gear comprising a central rotatable wheel, means to rotate the wheel, a driven gear on each side of the wheel and co-axial therewith, said driven gears being independently rotatable, a pinion mounted on each side of the wheel, each pinion being bodily rotatable with the wheel about the axis of the wheel, rotatable about its own axis, and in constant mesh with the corresponding driven gear, and means associated with each pinion tending to resist by centrifugal force generated by rotation of the wheel, the rotation of such pinion, so that a driving force is exerted on the driven gear meshing therewith.

4. A differential gear comprising a central rotatable wheel, means to rotate the wheel, a driven gear on each side of the wheel and co-axial therewith, said driven gears being independently rotatable, an idle pinion mounted on each side of the wheel, each pinion being bodily rotatable with the wheel, about the axis of the wheel, rotatable about its own axis and in constant mesh with the corresponding driven gear, said idle gear being constructed and adapted to be retarded in rotating on its axis by centrifugal force generated by rotatation of said wheel, and to impart rotary motion to said gear by virtue of such retardation.

5. In a differential gear, in combination, spaced co-axial driven gears, a rotatable idler gear meshing with each of said driven gears, means for revolving said idler gears simultaneously around the common axis of said driven gears, and means associated with each idler gear to retard the rotary motion thereof on its axis and to thereby impart rotary motion to the corresponding driven gear, said means including a centrifugal element revoluble about the common axis of the driven gears by said revolving means.

6. In a differential gear, in combination, spaced co-axial rotatable driven members, a rotatable drive member and differential gearing connecting said drive and driven members including two rotatable planetary elements each operatively connected to one driven member and both operatively connected to said drive member, and a centrifugal element associated with each planetary element and tending to retard rotation thereof whereby a driving force is exerted thereby on the corresponding driven element.

GEORGE B. COLEMAN.